US010956841B2

(12) United States Patent
Langborg-Hansen et al.

(10) Patent No.: US 10,956,841 B2
(45) Date of Patent: Mar. 23, 2021

(54) CALCULATING POWER USAGE EFFECTIVENESS IN DATA CENTERS

(71) Applicant: SCHNEIDER ELECTRIC IT CORPORATION, West Kingston, RI (US)

(72) Inventors: Kristian Toustrup Langborg-Hansen, Christiansfeld (DK); Torben Nielsen, Odense (DK); Mikkel Dalgas, Hejls (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 1091 days.

(21) Appl. No.: 14/899,794

(22) PCT Filed: Jun. 28, 2013

(86) PCT No.: PCT/US2013/048608
§ 371 (c)(1),
(2) Date: Dec. 18, 2015

(87) PCT Pub. No.: WO2014/209370
PCT Pub. Date: Dec. 31, 2014

(65) Prior Publication Data
US 2016/0140468 A1     May 19, 2016

(51) Int. Cl.
*G06Q 10/06* (2012.01)
*G06Q 50/06* (2012.01)
*H04L 12/24* (2006.01)

(52) U.S. Cl.
CPC ....... *G06Q 10/06313* (2013.01); *G06Q 10/06* (2013.01); *G06Q 50/06* (2013.01); *H04L 41/0833* (2013.01); *Y02P 90/84* (2015.11)

(58) Field of Classification Search
None
See application file for complete search history.

(56) References Cited

U.S. PATENT DOCUMENTS

| 2008/0189567 A1 | 8/2008 | Goodnow et al. |
| 2009/0112522 A1* | 4/2009 | Rasmussen ............. G06F 30/13 702/186 |

(Continued)

FOREIGN PATENT DOCUMENTS

| CN | 101165632 A | 4/2008 |
| WO | 20080144375 A2 | 11/2008 |

(Continued)

OTHER PUBLICATIONS

Notification of Transmittal of the International Search Report and the Written Opinion of the International Searching Authority from corresponding PCT/US2013/048608 dated Jan. 14, 2014.

(Continued)

*Primary Examiner* — Akosua Kyereme-Tuah
(74) *Attorney, Agent, or Firm* — Lando & Anastasi, LLP

(57) ABSTRACT

A system and method of measuring efficiency of a datacenter is provided. The method includes the acts of identifying at least one space within a model of a datacenter, the at least one space including a first equipment group consuming at least one shared resource provided by at least one shared resource provider, determining an amount of power consumed by the first equipment group, determining an amount of the at least one shared resource consumed by the first equipment group, determining an amount of power consumed by the at least one shared resource, calculating a loss of the first equipment group, and calculating an efficiency metric based on the amount of power consumed by the first equipment group, the amount of power consumed by the at least one shared resource provider, the loss of the first equipment group, and the loss of the at least one shared resource provider.

20 Claims, 8 Drawing Sheets

(56) References Cited

U.S. PATENT DOCUMENTS

| | | | | |
|---|---|---|---|---|
| 2009/0201293 A1* | 8/2009 | Tung | ................ | G06Q 50/06 |
| | | | | 345/440 |
| 2015/0016056 A1* | 1/2015 | Endo | ................ | G06F 1/206 |
| | | | | 361/679.49 |

FOREIGN PATENT DOCUMENTS

| WO | 2009058880 A2 | 5/2009 | | |
|---|---|---|---|---|
| WO | 2009/111686 A1 | 9/2009 | | |
| WO | 20090111686 A1 | 9/2009 | | |
| WO | WO-2009111686 A1 * | 9/2009 | ........... | G06F 1/3203 |
| WO | 2009152553 A1 | 12/2009 | | |

OTHER PUBLICATIONS

Extended European Search Report from corresponding European Application No. 13888426.7 dated Nov. 4, 2016.

* cited by examiner

CALCULATING POWER USAGE EFFECTIVENESS IN DATA CENTERS

CROSS-REFERENCE TO RELATED APPLICATIONS

This application is a U.S. National Stage Application under 35 U.S.C. § 371 of International Application No. PCT/US2013/048608, filed Jun. 28, 2013, titled CALCULATING POWER USAGE EFFECTIVENESS IN DATA CENTERS, which is hereby incorporated herein by reference in its entirety.

BACKGROUND

Technical Field

The present disclosure relates generally to measuring power usage and, more particularly, to systems and methods for measuring and improving power usage efficiency within a data center.

Discussion

In response to the increasing demands of information-based economies, information technology networks continue to proliferate across the globe. One manifestation of this growth is the centralized network data center. A centralized network data center typically consists of various information technology equipment, collocated in a structure that provides shared resources (e.g., network connectivity, electrical power, and cooling capacity) to the information technology equipment. In some data centers, information technology equipment is housed in specialized enclosures (referred to as "racks") that integrate connectivity, power and cooling elements. These racks may be located in one or more rooms. In some data centers, racks are organized into rows, and these rows may be arranged to form hot and cold aisles to decrease the cost associated with cooling the information technology equipment. These characteristics make data centers a cost effective way to deliver the computing power required by many software applications.

In general, data centers have a power distribution system configured to avoid power outages because the data centers include a high percentage of critical loads without which an enterprise may be unable to operate. Often, an uninterruptible power supply ("UPS") is employed in the power distribution system to ensure that equipment receives continuous power and avoids any power outages. Typical power distribution systems include racks of equipment, for example, servers and the like that are located in the data center. Generally, many power distribution circuits are provided, and each circuit supplies power to one or more electrical loads (e.g., servers, cooling systems, lighting circuits, etc.) via a circuit breaker. These systems generally include racks in which the circuit breakers are installed (i.e., power distribution units) or alternatively racks that include an electrical panel board which is, in general, similar in design to the panel boards that are found in ordinary commercial facilities.

SUMMARY

The embodiments disclosed herein manifest an appreciation that many data centers waste substantial amounts of electrical power. According to various aspects and embodiments, a method of measuring efficiency of a data center is provided. The method includes the acts of identifying at least one space within a computer-implemented model of a data center, the at least one space including a first equipment group consuming at least one shared resource provided by at least one shared resource provider, determining an amount of power consumed by the first equipment group, determining an amount of the at least one shared resource consumed by the first equipment group, determining an amount of power consumed by the at least one shared resource provider in providing the amount of the at least one shared resource to the first equipment group, calculating a loss incurred by the first equipment group based on the amount of power consumed by the first equipment group, calculating a loss incurred by the at least one shared resource provider based on the amount of power consumed by the at least one shared resource provider, and calculating an efficiency metric for the at least one space based on the amount of power consumed by the first equipment group, the amount of power consumed by the at least one shared resource provider, the loss incurred by the first equipment group, and the loss incurred by the at least one shared resource provider.

The act of calculating the efficiency metric may include calculating at least one of a Power Usage Effectiveness (PUE), a Green Energy Coefficient (GEC) value, an Energy Reuse Factor (ERF) value, and a Carbon Usage Effectiveness (CUA). The efficiency metric may be a PUE metric. The method may further comprise the act of computing the PUE metric based on an estimated amount of power consumed by the first equipment group and an estimated loss incurred by the first equipment group. The act of determining the amount of power consumed by the first equipment group may include determining whether equipment in the first equipment group incurs at least one of a fixed loss, a proportional loss, or a square-law loss. The method may further include the act of receiving data descriptive of at least one of a measured amount of power consumed by respective pieces of equipment within the first equipment group, an estimate amount of power consumed by respective pieces of equipment within the first equipment group, efficiency properties of respective pieces of equipment within the equipment group, and power connections between respective pieces of equipment within the first equipment group.

The at least one shared resource may be cooling, and the at least one shared resource provider may be a cooling unit. The method may further include the acts of determining an amount of cooling consumed by distribution equipment supplying power to the cooling unit, the distribution equipment being included in the first equipment group, and adjusting the amount of power consumed by the at least one shared resource provider based on the amount of cooling consumed by the distribution equipment.

The act of determining the amount of cooling consumed by the distribution equipment supplying power to the cooling unit may include determining an amount of cooling consumed by distribution equipment supplying power to at least one of a CRAH, CRAC, fan, chiller unit, ventilation unit, cooling tower, and pumps.

The method may further include the acts of recalculating, responsive to adjusting the amount of power consumed by the at least one shared resource provider, the loss incurred by the at least one shared resource provider, and calculating a loss per kilowatt (kW) factor based on the loss incurred by the at least one shared resource provider, the amount of power consumed by the first equipment group, and the amount of power consumed by the distribution equipment.

The act of determining the amount of power consumed by the at least one shared resource provider may include calculating an estimated amount of power consumed by the at least one shared resource provider and determining the loss incurred by the at least one shared resource provider includes calculating an estimated loss incurred by the at least one shared resource provider. The method may further include the act of determining a ratio of consumption between the first equipment group and a second equipment group included within at least one second space with the computer implemented model.

The method may further include the acts of calculating a first PUE for the at least one first space, calculating a second PUE for the at least one second space, and calculating a third PUE for the data center based on the first PUE and the second PUE. The act of calculating the second PUE may include calculating a second PUE for an identified space including unrecorded equipment.

In another embodiment, a data center management system is provided. The data center management system may include a memory, and at least one processor coupled to the memory. The at least one processor is configured to identify at least one space within a model of a data center, the at least one space including a first equipment group consuming at least one shared resource provided by at least one shared resource provider, determine an amount of power consumed by the first equipment group, determine an amount of the at least one shared resource consumed by the first equipment group, determine an amount of power consumed by the at least one shared resource provider in providing the amount of the at least one shared resource to the first equipment group, calculate a loss incurred by the first equipment group based on the amount of power consumed by the first equipment group, calculate a loss incurred by the at least one shared resource provider based on the amount of power consumed by the at least one shared resource provider, and calculate an efficiency metric for the at least one space based on the amount of power consumed by the first equipment group, the amount of power consumed by the at least one shared resource provider, the loss incurred by the first equipment group, and the loss incurred by the at least one shared resource provider.

The at least one processor may be further configured to calculate at least one of a Power Usage Effectiveness (PUE), a Green Energy Coefficient (GEC) value, an Energy Reuse Factor (ERF) value, and a Carbon Usage Effectiveness (CUA). The efficiency metric may be a PUE metric. The at least one processor may be further configured to compute the PUE metric based on an estimated amount of power consumed by the first equipment group and an estimated loss incurred by the first equipment group.

The at least one processor may be further configured to determine whether equipment in the first equipment group incurs at least one of a fixed loss, a proportional loss, or a square-law loss. The at least one processor may be further configured receive data descriptive of at least one of a measured amount of power consumed by respective pieces of equipment within the first equipment group, an estimate amount of power consumed by respective pieces of equipment within the first equipment group, efficiency properties of respective pieces of equipment within the equipment group, and power connections between respective pieces of equipment within the first equipment group. The at least one shared resource may be cooling, and the at least one shared resource provider may be a cooling unit. The at least one processor maybe further configured to determine an amount of cooling consumed by distribution equipment supplying power to the cooling unit, the distribution equipment being included in the first equipment group, and adjust the amount of power consumed by the at least one shared resource provider based on the amount of cooling consumed by the distribution equipment.

The at least one processor may be further configured to determine an amount of cooling consumed by distribution equipment supplying power to at least one of a CRAH, CRAC, fan, chiller unit, ventilation unit, cooling tower, and pumps. The at least one processor may be further configured to recalculate, responsive to adjusting the amount of power consumed by the at least one shared resource provider, the loss incurred by the at least one shared resource provider, and calculate a loss per kilowatt (kW) factor based on the loss incurred by the at least one shared resource provider, the amount of power consumed by the first equipment group, and the amount of power consumed by the distribution equipment.

In still another embodiment, a computer readable medium having stored thereon sequences of instructions for measuring efficiency of a data center is provided. The instructions cause at least one processor to identify at least one space within a model of a data center, the at least one space including a first equipment group consuming at least one shared resource provided by at least one shared resource provider, determine an amount of power consumed by the first equipment group, determine an amount of the at least one shared resource consumed by the first equipment group, determine an amount of power consumed by the at least one shared resource provider in providing the amount of the at least one shared resource to the first equipment group, calculate a loss incurred by the first equipment group based on the amount of power consumed by the first equipment group, calculate a loss incurred by the at least one shared resource provider based on the amount of power consumed by the at least one shared resource provider, and calculate an efficiency metric for the at least one space based on the amount of power consumed by the first equipment group, the amount of power consumed by the shared resource provider, the loss incurred by the first equipment group, and the loss incurred by the at least one shared resource provider.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
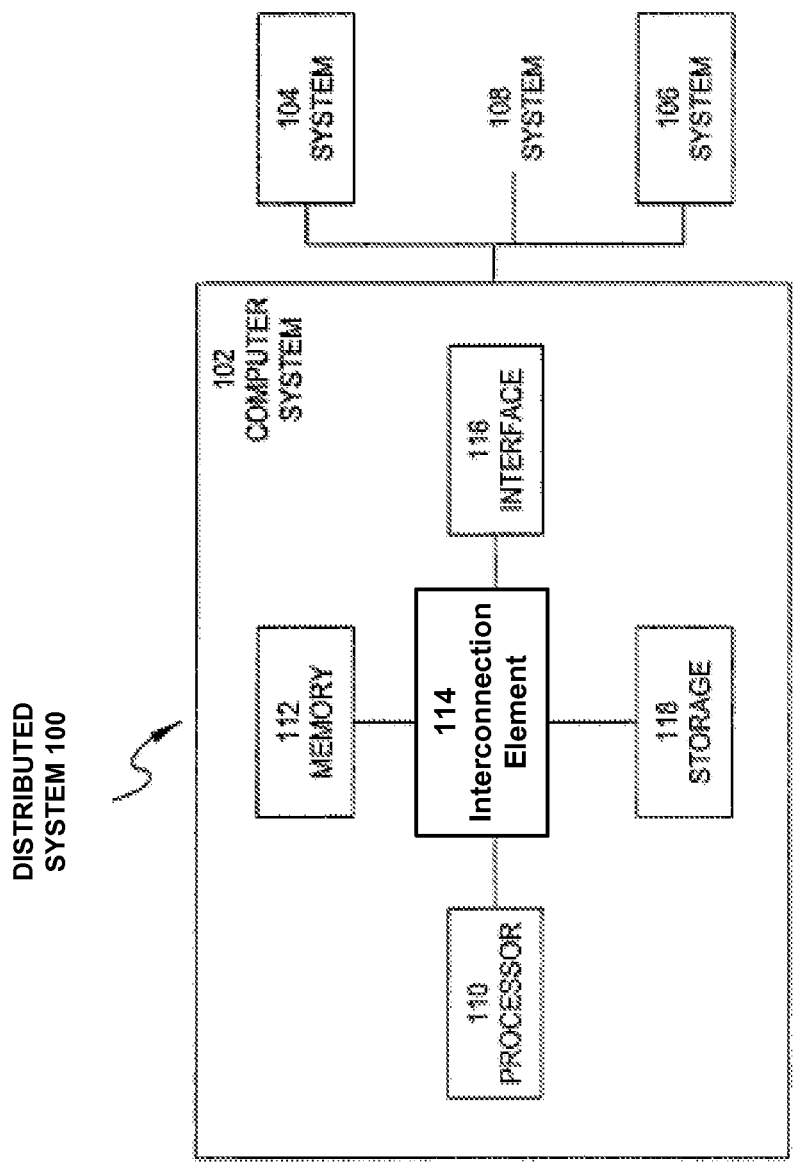
FIG. 1 shows a block diagram of a distributed computer system according to one embodiment.

Some aspects and embodiments provide methods and systems for measuring and modeling the energy efficiency of data centers. One method of measuring energy efficiency involves calculation of Power Usage Effectiveness (PUE) for a data center. PUE is the industry standard for measuring data center energy efficiency and is a key performance indicator for many information technology managers in determining power efficiency of data centers. PUE indicates how well a data center is delivering energy to its information technology equipment. Data center personnel can apply PUE by analyzing changes in PUE values for an individual data center in relation to changes in data center design and operations. At least some formulations of PUE measure a relationship between the total energy consumed by a data center and the energy consumed by IT (Information Technology) equipment installed within the data center. When viewed in the proper context, this formulation of PUE can provide strong guidance for and useful insight into the design of efficient power and cooling architectures, the deployment of equipment within those architectures, and the day-to-day operation of that equipment.

Conventional PUE calculation methods and tools all provide for calculating the PUE of a data center that is self-contained (i.e., all resources used in the data center are used only by that data center and not shared with another data center) However, data centers often share common resource providers (or subsystems). In some data center configurations, a generator, switchgear, a cooling solution and other subsystems may be shared between a number of data centers at the same location. Also the cooling loop of the data center may extend into an occupied space near to the data center providing comfort cooling for office areas. It is appreciated that the current formulations of PUE calculation do not account for these situations.

Therefore, in the embodiments disclosed herein, systems and methods accurately calculate one or more fractions of the energy consumed by a shared resource that supplies one or more identified spaces within a data center. These identified spaces may include, for example, one or more data center rooms. Further, the identified spaces may contain one or more equipment groups. For example, equipment groups may be housed in one or more racks, or may be groups of associated racks. The racks may contain severs, UPS equipment, power distribution devices and other data center equipment. In other examples, equipment groups may be stand alone equipment such as power distribution equipment, cooling equipment and the like. In some embodiments, the system further calculates PUE of a data center that shares resources with non-measurable systems, such as an office cooling system.

At least some embodiments disclosed herein relate to systems, apparatus, and processes through which a user may design and analyze data center power usage as well as power usage shared with other portions of building infrastructure. These systems, apparatus, and processes may facilitate this design and analysis activity by allowing the user to create models of power configurations from which performance metrics are determined. Both the systems and the user may employ these performance metrics to determine alternative cooling and power infrastructure configurations that meet various design objectives.

The aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center and building configurations. Further, computer systems in embodiments may be used to automatically measure environmental parameters and power usage in a data center or a building, and control equipment, such as chillers or coolers to optimize performance. Moreover, the systems described herein may be configured to include or exclude any of the functions discussed herein. Thus the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TLS, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, interconnection element 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 110 is connected to other system elements, including one or more memory devices 112, by interconnection element 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of the computer system 102 are coupled by an interconnection element such as the interconnection element 114. The interconnection element 114 may include one or more physical busses, for example, busses between components that are integrated within a same machine, but may include any communication coupling between system elements including specialized or standard computing bus technologies such as IDE, SCSI, PCI and InfiniBand. The interconnection element 114 enables communications, such as data and instructions, to be exchanged between system components of the computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accord with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Example System Architecture

Figure 2:
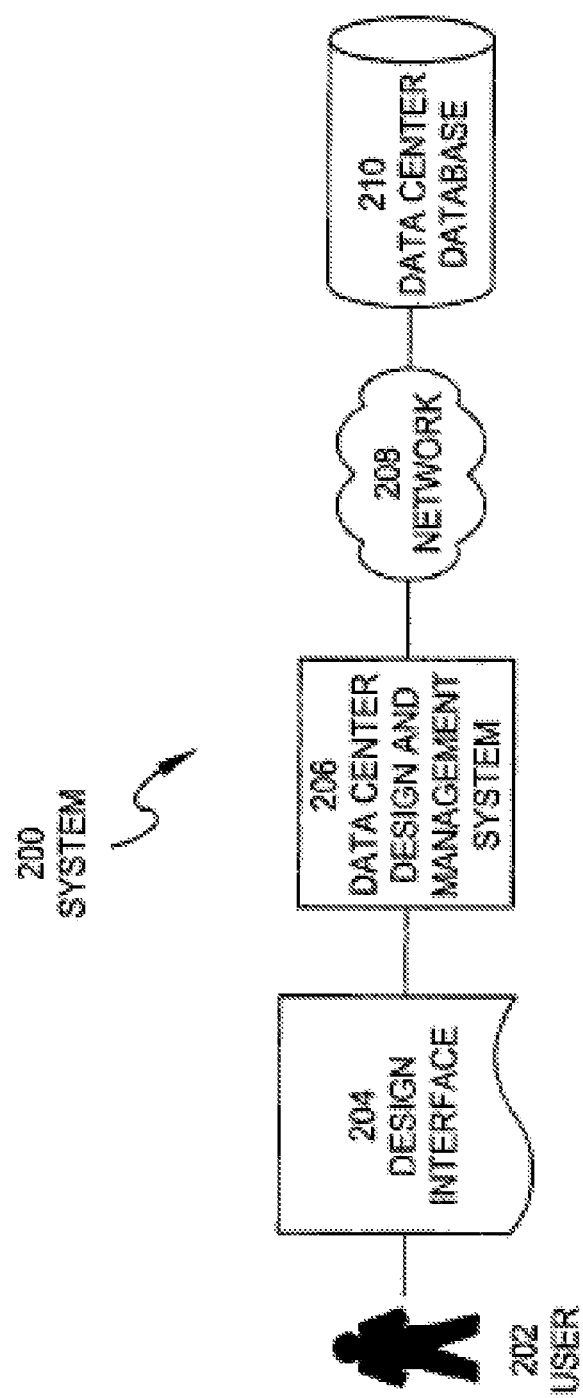
FIG. 2 presents a context diagram including physical and logical elements of a distributed system according to one embodiment.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is assigned to the assignee of the present application and which is hereby incorporated herein by reference in its entirety (referred to herein as "the PCT/US08/63675 application"). In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204 are discussed further below, as may be found in various embodiments disclosed herein. In at least one embodiment, information regarding a data center is received by the system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information needed to support the features and functions of data center design and management system 206. For example, in one embodiment, data center database 210 may include at least some portion of the data stored in the data center equipment database described in PCT/US08/63675. In another embodiment, this information may include any information needed to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store information pertaining to types of cooling providers, the amount of cool air provided by each type of cooling provider, and a temperature of cool air provided by the cooling provider. Thus, for example, data center database 210 includes records pertaining to a particular type of CRAC unit that is rated to deliver airflow at the rate of 5,600 cubic feet per minute (cfm) at a temperature of 68 degrees Fahrenheit. In addition, the data center database 210 may store information pertaining to one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 200. In another embodiment, data center database 210 may store information pertaining to the types of computing or IT devices (such as servers), and may further include information pertaining to server weight, estimated heat capacity for the server, maximum CPU loading capacity, as well as other information.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include or be included in one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. The embodiments described herein are not limited to a specific number of users or systems.

Additionally, it is to be appreciated that in some embodiments illustrated by FIG. 2, the design interface 204, the data center design and management system 206, the network 208, and the data center database 210 may be incorporated into a stand-alone (non-distributed) computer system. In these in embodiments, the data center design and management system 206 and the design interface 204 are implemented by one or more local processors, such as the processor 110 described above with reference to FIG. 1. Further, in these embodiments, the network 208 includes an interconnection element, such as the interconnection element 114 described above with reference to FIG. 1, that enables data communication between the data center database 210 and the data center design and management system 206. Moreover, in these embodiments, the data center database 210 is stored in non-volatile, local storage that is accessible by the data center design and management system 206, such as the data storage 118 described above with reference to FIG. 1.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 200 may be a computer system including an operating system that manages at least a portion of the hardware elements included in the computer system 200. In some examples, a processor or controller, such as the processor 110 (FIG. 1), executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 110 (FIG. 1) and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

In some embodiments described herein, a PUE metric is determined for data centers sharing common resources, such as cooling loops, power generators, or switchgear. According to at least one formulation, the PUE metric for a dedicated building is calculated according to Equation 1:

$$PUE = \frac{\text{Total Facility Energy}}{\text{IT Equipment Energy}} \qquad \text{Equation (1)}$$

where the Total Facility Energy is the total energy consumed by all equipment the dedicated building and the IT Equipment Energy is the total energy consumed by the IT equipment installed within the dedicated building.

More specifically, referring to the formulation of PUE given in Equation 1, some embodiments measure the energy used by one or more components of a data center and aggregate the component measurements to compute Total Facility Energy and IT Equipment Energy. For example, the IT Equipment Energy may include the energy associated with all of the IT equipment (e.g., compute, storage, and network equipment) along with supplemental equipment (e.g., KVM switches, monitors, and workstations/laptops used to monitor or otherwise control the data center). In at least one example, total facility energy can include IT Equipment Energy as described above plus everything that supports the IT equipment using energy. In one example, the resource providers that support IT equipment can include power delivery components such as UPS systems, switchgear, generators, power distribution units (PDUs), batteries, and distribution losses external to the IT equipment. Further equipment that supports IT equipment energy may include cooling system components such as chillers, cooling towers, pumps, computer room air handling units (CRAHs), computer room air conditioning units (CRACs), and direct expansion air handler (DX) units. In another example, equipment that supports IT equipment energy may include various miscellaneous component loads (e.g., data center lighting and the like).

It is appreciated that PUE values may not be accurately calculated using name plate ratings of a data center's IT equipment or mechanical infrastructure components. Instead, actual energy measurements may be collected for components of PUE calculations that have a correlation to an operational data center. Methods of energy measurements and calculation of efficiency are described in International Patent Application Number PCT/US2008/081602, filed Oct. 29, 2008, titled ELECTRICAL EFFICIENCY MEASUREMENT FOR DATA CENTERS (referred to hereinafter as "the PCT/US2008/081602 Application"), which is assigned to the assignee of the present application and which is hereby incorporated herein by reference in its entirety.

The PCT/US2008/081602 Application describes a data center model that accurately represents the workings of a specific data center, and accepts as inputs the IT load, outdoor weather statistics, time-of-day electric rates, etc., may be used effectively in a data center energy management program. Unlike the measurement of an actual operating data center, which provides only data for the conditions at the time of measurement, a model can provide a range of data based on input conditions. For example, a model could provide the expected value of the efficiency of a data center at full load, even when the IT load is a small fraction of the rated load. Models of two different data centers may be analyzed using the same input conditions, which allows for a meaningful comparison. Furthermore, a model can be created before a data center is built, allowing the prediction of performance prior to construction.

In embodiments described herein, a shared PUE is calculated. This new metric indicates energy consumed by an identified space (such as a data center or data center room) within a mixed-use facility, i.e. a data center that is located within a building that may support other functions. For example, a data center may occupy a single floor within an office building that contains some combination of non-IT operations, such as general administrative office space. A mixed-use facility may have a distinct infrastructure (e.g., UPS and cooling system) dedicated to each identified space, or may have an infrastructure that is shared among identified spaces.

Calculation of PUE for data centers or data center rooms that share resources is difficult to do correctly as the power consumption of the shared subsystem is to be divided between the data centers sharing it. To empirically measure the power consumption accurately, meters need to be in place, and some of the needed measurements are difficult to take within particular installations. Without the ability to determine how much of the shared subsystems should be included in the PUE calculation, it is difficult to determine the precise power consumption and to optimize the power usage.

Previous approaches to determining the load of shared subsystems for PUE included adding enough meters to the data center to allow exact division of shared power consumption. However, this approach can be expensive and adding a large amount of meters to an existing data center can prove difficult and time consuming. In some instances, installing meters at the required places may not be possible.

Other approaches include estimating the division of shared subsystems using knowledge of the data centers and building usage. This approach can be imprecise and typically does not take into account that the usage of power between shared subsystems of the data centers may fluctuate over time. For example, if the data center shares its cooling loop with the comfort cooling of an office space, the fraction of cooling spent by each may vary with the outside temperature and time of day.

Yet another previous approach includes distributing the consumption of the shared subsystem based on the usage of another shared subsystem that is measured (e.g. total the total power usage). Often the fraction of a shared resource that should go into a data center is set to be the same fraction that that data center uses of the total power consumption.

Although this approach is more precise than the approaches listed above, this approach still lacks accuracy when the actual consumption of the shared subsystem does not precisely follow the power consumption. For instance, in a data center with two rooms sharing a common cooling loop, each data center room's cooling usage depends on a number of other factors other than just total power consumption (i.e., infiltration, effectiveness of cooling solution in the room).

In the embodiments described below, a computer system, such as one or more of the computer systems described with reference to FIG. 1, calculates the load of all cooling equipment and power providers. The system then calculates the loss of the shared subsystem in each of the energy systems that share each resource. The estimated loss is adjusted according to the difference in efficiency.

Today's data centers are huge sites with multiple data center rooms. Typically, these rooms share the same power and cooling infrastructure. A site generally has one common switchgear that receives power from the power plant, and cooling systems to ensure adequate cooling for all rooms on the site. In addition to this, each data center room has equipment that is used solely by that room. For example the racks, servers, and the lighting and chillers, or in-row coolers, are relevant only within a room.

Figure 3A:
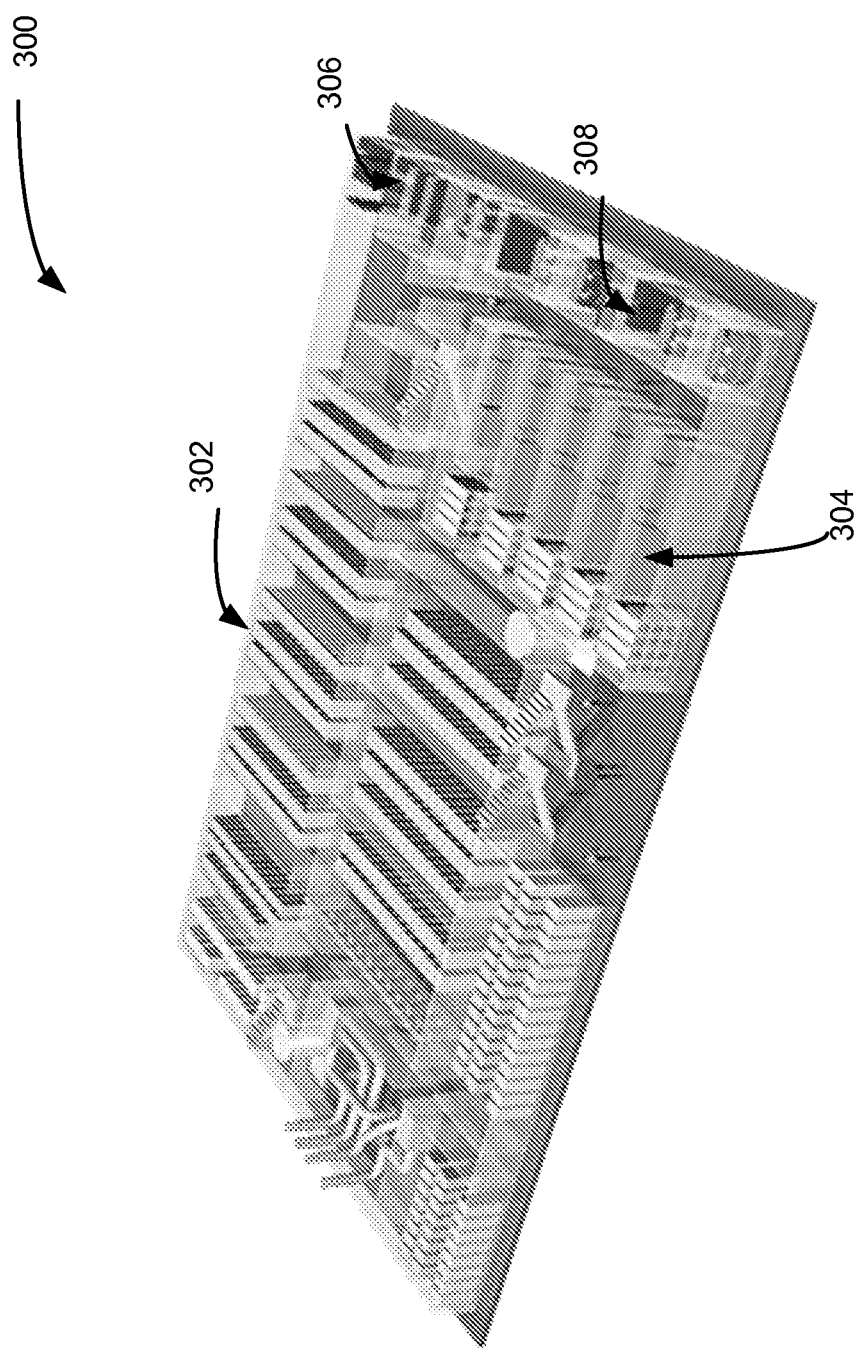
FIG. 3A illustrates one example of a data center according to embodiments disclosed herein.

FIG. 3A illustrates one example of a data center 300 including equipment that is used by the data center 300. In this example, the equipment racks 302 are located in six different IT equipment rooms, and chillers 304 are all in the same room. The power equipment including switchgear 306 and UPS 308 are also available for the rooms. All the data center rooms may rely on the power supplied by the UPS 308 and the cold water supplied by the chillers 302. Determining the PUE of each IT equipment room of the data center 300 is relevant to determining how optimizations and improvements may be made to each room individually. For example, if one of the six rooms houses legacy equipment, it may be beneficial to compare the PUE of the legacy equipment room to that of a new IT equipment room. However, the previous PUE methods, as described above, are imprecise and cannot account for rooms of unequal size, load, and capacity. As described below, methods and systems are disclosed herein which allow for accurate room-based PUE determinations for a data center 300 which may include rooms of unequal size, load, and capacity in various scenarios. As described further below, the approaches of FIGS. 4 and 5 outline two scenarios which accomplish such a room-based PUE determination.

Figure 3B:
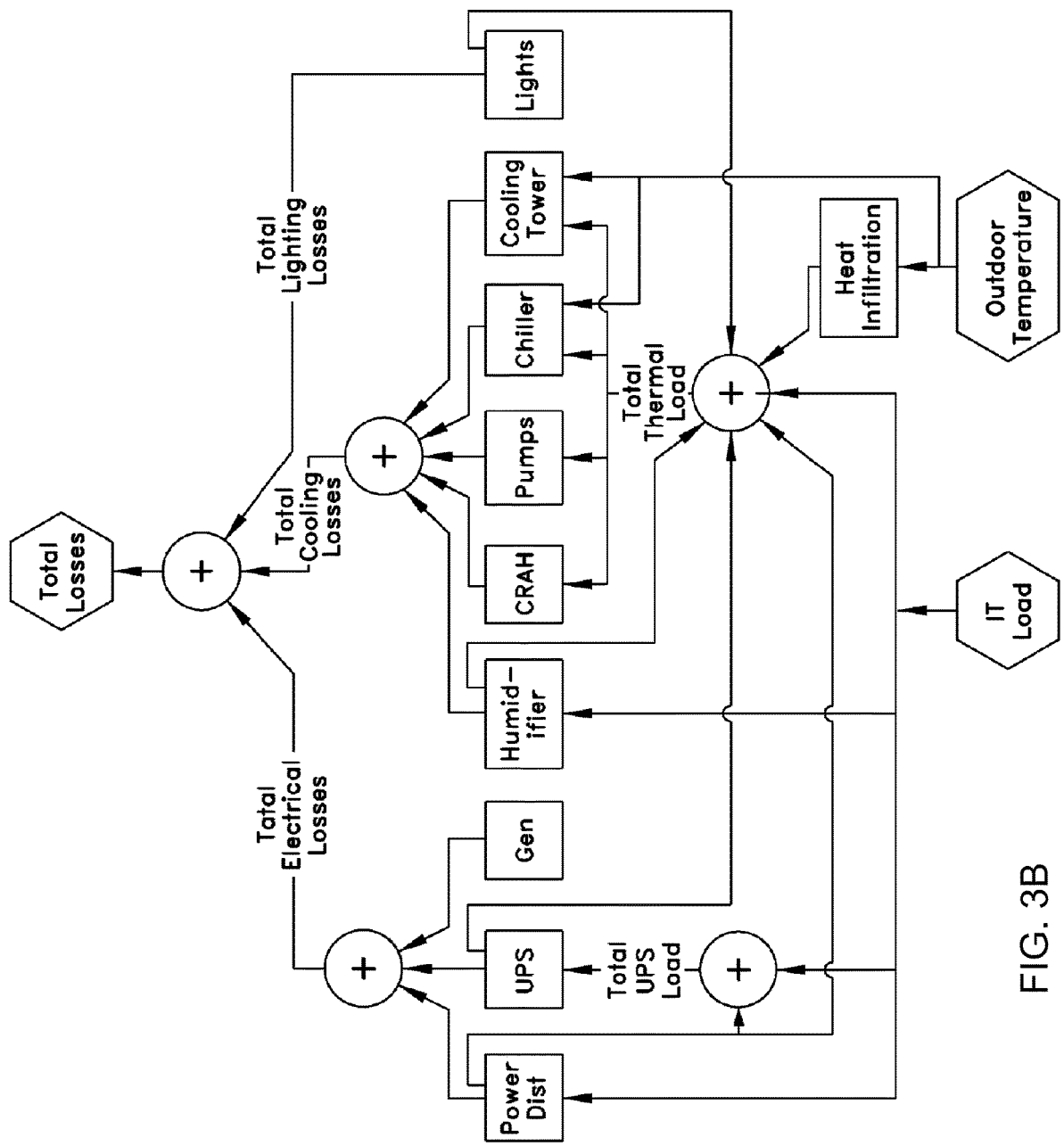
FIG. 3B is an energy flow diagram for a practical data center efficiency model according to one embodiment.

FIG. 3B illustrates one example of an energy flow diagram for a practical data center efficiency model. The practical data center efficiency model depicts how the data center infrastructure power consumption (losses) are determined by the IT load and outdoor conditions, giving rise to energy flows within the power, cooling, and lighting systems. Each device class in the data center (UPS, CRAH, etc.) accepts a load as an input and generates power consumption (loss) according to the device configuration and inherent efficiency characteristics. An efficiency model for a data center can be created for an existing data center, or it can be created before a data center is even constructed, if the design and the characteristics of the power, cooling, and lighting devices are known. If the model accurately represents the design, the data it provides will be similarly accurate.

The systems, apparatus, and processes described herein may utilize a data center model, such as the center model described in FIG. 3B and the PCT/US2008/081602 Application. The systems, apparatus, and processes, however, do not need the entire site or data center to be modeled. Instead, the systems, apparatus, and processes may generalize data center configurations to two scenarios, scenario 400 shown in FIG. 4 and scenario 500 shown in FIG. 5. In each scenario, the objective is to calculate two PUE values: one for data center room 402 and 502 shown in FIG. 4 and FIG. 5, respectively, and one for data center room 404 and 504 shown in FIG. 4 and FIG. 5, respectively.

Figure 4:
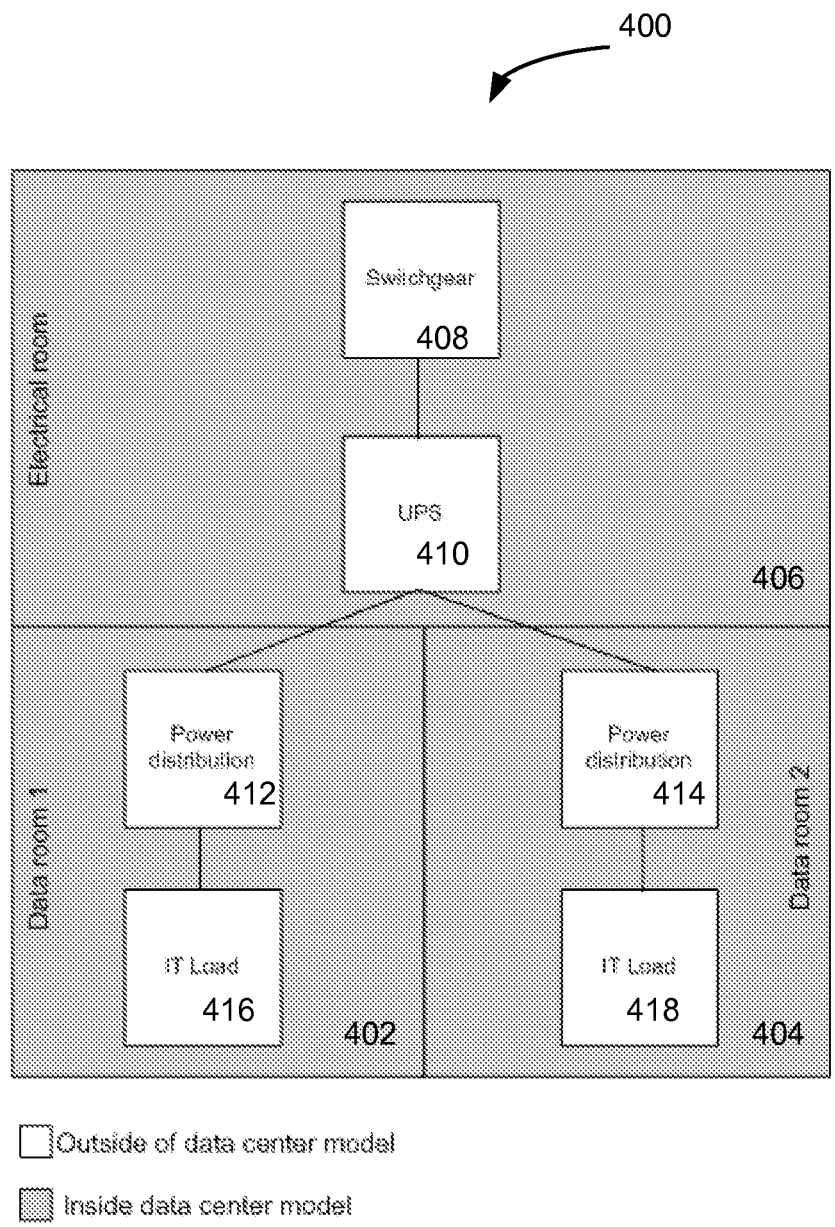
FIG. 4 is an illustration of one example of a scenario according to one embodiment.

Referring to FIG. 4, illustrated is one example of a scenario generally designated at 400 which includes a data center room 402, a data center room 404, and an electrical room 406. The equipment in the electrical room 406 includes switchgear 408 and a UPS 410, with each of the switchgear 408 and the UPS 410 being shared between the data center room 402 and 404. The data center room 402 includes power distribution equipment 412 and an IT load 416. Similarly, the data center room 404 includes power distribution 414 and an IT load 418. Both the data center room 402 and 404 are located inside the data center model. Therefore, in the scenario 400 shown, all the data center rooms sharing the resources are identified (i.e., all subsystems are either measured or estimated) within the data center model. Using the power values of the identified rooms, a system may use the data center model to estimate the power consumption of the shared subsystems. In this example, power values for actual power consumption and power loss of a subsystem depends on its current load. Because the load comes from more than one subsystem, it is therefore difficult to correctly estimate the power values only using the information from one of the data center rooms 402, 404, and 406. However, estimating a value for actual power consumption and power loss of the shared subsystems for each of the data center rooms 402, 404 and 406 results in data useful for determining the fraction used to divide the power consumption of the shared subsystems, as described further below in method 600 of FIG. 6.

Figure 5:
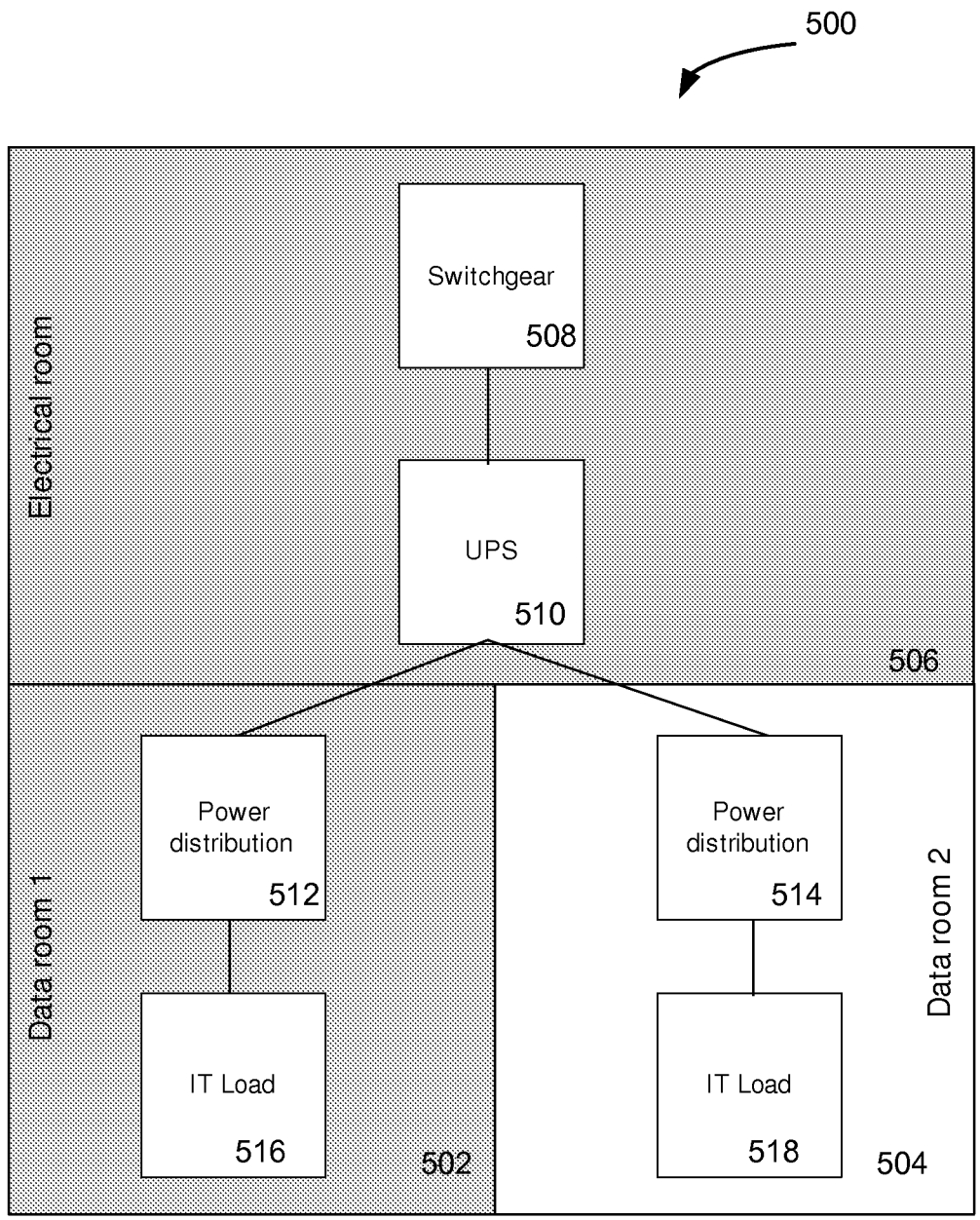
FIG. 5 is an illustration of another example of a scenario according to one embodiment.

Referring to FIG. 5, there is illustrated one example of a scenario generally designated at 500, which includes data center room 502, data center room 504, and an electrical room 506. The equipment in the electrical room 506, including switchgear 508 and UPS 510, is shared between the data center room 502 and 504. As shown, the scenario 500 includes the data center room 502 and 506 identified as inside a data model and the data center room 504 unidentified and outside of the data center model (i.e., subsystems are not measured or estimated, equipment is not recorded, etc. . . . ). However, according to other embodiments, the scenario 500 may include more than two identified data center rooms within the data center model. Likewise, according to other embodiments, the scenario 500 may include more than one unidentified data center room outside of the data center model. The data center room 502 includes power distribution equipment 512 and IT load 516. Similarly, data center room 504 includes power distribution 514 and IT load 518.

As shown, the scenario 500 includes the data center room 504 which includes undetermined power values for power consumption and power loss. The approach discussed above in regards to FIG. 4 assumes that each data room 402, 404, and 406 are measured or estimated. In order to account for the data room 504 without estimating or measuring the power values for the data center room 504, the solution to scenario 500 is to use the data center model of the data center rooms identified inside the data model to estimate the power values of the shared subsystems. Within the context of the scenario 400 of FIG. 4, the undetermined load drawn by the data center room 504 would produce an inaccurate load calculation. This is because scenario 400 does not to take in to account that the actual loss of the shared subsystems is related to the total load of that shared subsystem. In one embodiment, the solution to scenario 500 is that the total load of the shared subsystem is measured. Because the shared subsystem is modeled in the data center model, the total load and loss of the shared subsystem may be calculated. Loss is a function of the load, and the load that a data center room under evaluation puts on the shared subsystem is calculated based on the estimation done in the data center model. Thus, the actual loss caused by the data center room under evaluation at the current level of load of the shared subsystem may be calculated.

Figure 6:
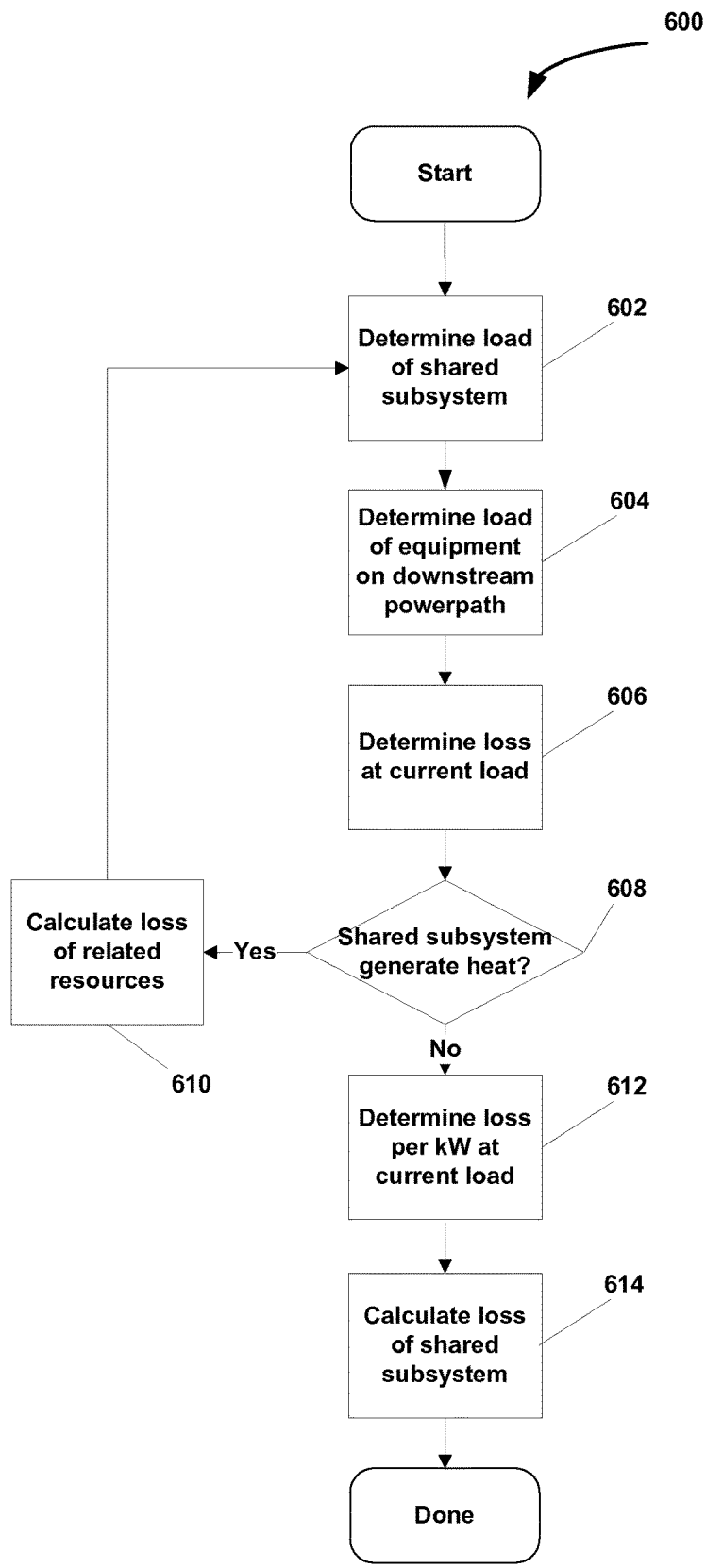
FIG. 6 is a method directed to estimating power values of shared subsystems of a data center.

FIG. 6 illustrates one example of a method 600 that uses a model of the data center rooms identified within the data center model to estimate the power values of the shared subsystems. In the method 600, the shared subsystem is identified in the data center model and the total load and loss of the shared subsystem is calculated. As discussed above, the loss is a function of the load, and the load that the data center rooms put on the shared subsystem is determined from the estimation done based on the data center model. Therefore, the actual loss caused by the data center rooms at the current level of load of the shared subsystem may be calculated as described below.

At act 602, a system determines the load of the shared subsystem based on each piece of equipment connected to the downstream path of a shared subsystem. If the equipment in question is a power consumer (e.g., a blade server, a rack-mounted LCD panel), there is no equipment connected further downstream, and the load of the equipment is the amount of power consumed by the equipment itself. In step 604, the system determines the load if the equipment is a power distributor (e.g., a UPS). If the equipment is a power distributor, the system determines the load on the equipment as the sum of the load on all equipment connected to the shared subsystem plus the loss of the shared subsystem itself. For example, the load of a UPS is not only determined based on the loss (or efficiency) of the UPS itself, but also the load of component downstream from the UPS (e.g., the load of a cooling system supplied by the UPS to dissipate the heat generated by the UPS). The load on the shared subsystem can be calculated using Equation 2:

$$\sum_{n=0} l(e_n) + m \qquad \text{Equation (2)}$$

where l is the load of equipment e, and m is the loss of the shared subsystem.

At act 606, the system calculates the loss at a current load. The loss of a piece of equipment at a given load is calculated as a function of the load of the shared subsystem determined at act 602 and 604, and based on constant values of fixed loss and proportional loss. The loss of equipment may be expressed using Equation (3):

$$m_e = a + l_e b + l_e c^2 \quad \text{Equation (3)}$$

where m is the loss of equipment e, l is the load on the equipment, a is the fixed loss, b is the proportional loss, and c is the square-law loss of the equipment.

At act 608, the system determines whether the shared subsystem generates heat within the data center room under evaluation (i.e., the data rooms 402, 404, 406 of FIG. 4 or the data rooms 502, 504, and 506 of FIG. 5). According to one embodiment, if the shared subsystem generates heat within the space under evaluation, the load of each cooling unit that cools the data center room under evaluation must be adjusted accordingly (i.e., because an increased load will be drawn by the cooling unit to dissipate the heat generated by the shared subsystem). It is important to note that only equipment placed within the data center needs to be taken into account. Although the fans of a chiller placed on a roof of a building do generate heat, that heat is not exchanged by the coolers, so it need not be taken into account. In this embodiment, if the equipment in question generates heat to be exchanged by cooling equipment, the load on this cooling equipment needs adjusting, and the method proceeds to act 610. If the subsystem generates no heat is exchanged via the cooling equipment, the method proceeds to act 612.

At act 610, the load of all equipment and power providers upstream from the equipment is adjusted to the new load determined at act 608. Afterwards, the method returns to act 602 and re-evaluates affected equipment. According to one embodiment, to prevent scenarios where this iteration will cause the process to never conclude, a minimum threshold of change in load is used at act 610. According to this embodiment, if the change of the load is above a minimum threshold, the method continues to act 610 and calculates loss of the heat related to the equipment. Likewise, if the change of the load is below the minimum threshold, the method continues to act 612 and does not start the re-evaluation at act 610.

When the load and losses have stabilized (i.e., the load on the cooling unit due to heat generation by the shared subsystem is below a threshold or non-existent), the loss per kilowatt (kW) factor at the current load is calculated at act 612. This is necessary to share the losses correctly between energy systems sharing the same subsystem. The loss kW is expressed using Equation (4):

$$\text{loss per kW} = \frac{m}{l} \quad \text{Equation (4)}$$

where m is the loss of the shared subsystem, and l is the current load of the shared subsystem.

At act 614, the loss of the shared subsystem in each of the energy systems that share this subsystem is obtained based on the loss per kW factor value calculated at act 612. The loss is determined by multiplying the load that each piece of equipment puts on the shared subsystem with the loss per kW factor value.

The efficiency of the subsystem can be calculated using Equation (5) as $$e(L_m) = (L_m - f(L_m))/L_m \quad \text{Equation (5)}$$

$L_m$ denotes the measured total load of the shared subsystem, f is the loss function of the shared subsystem, and $f(L_e)$ is the estimated loss of the shared subsystem. To determine the actual loss in Equation (5), the system uses input including the load of the equipment in the data center room (either measured or estimated), the efficiency properties of the equipment in the data center room (typically vendor specific), and the power connections between the equipment in the data center room (as stored in the data center database 210 described above with reference to FIG. 2).

Using the efficiency of the shared subsystem as calculated in Equation (5), the estimated load of the shared subsystem $(L_e)$ may be calculated. The estimated loss of the subsystem is therefore calculated using Equation (6):

$$f(L_e) \quad \text{Equation (6)}$$

This is not the actual loss as it is calculated at a different efficiency than the shared subsystem is actually running at. The actual loss is calculated using Equation (7):

$$\text{actual loss} = f(L_e)/e(L_e) * e(L_m), \text{ where } e(L_e) = (L_e - f(L_e))/L_e \quad \text{Equation (7)}$$

It is to be appreciated that, by executing processes in accord with the method 600, a computer system can determine the power consumption of a shared resource provider without empirically measuring the power consumption.

Figure 7:
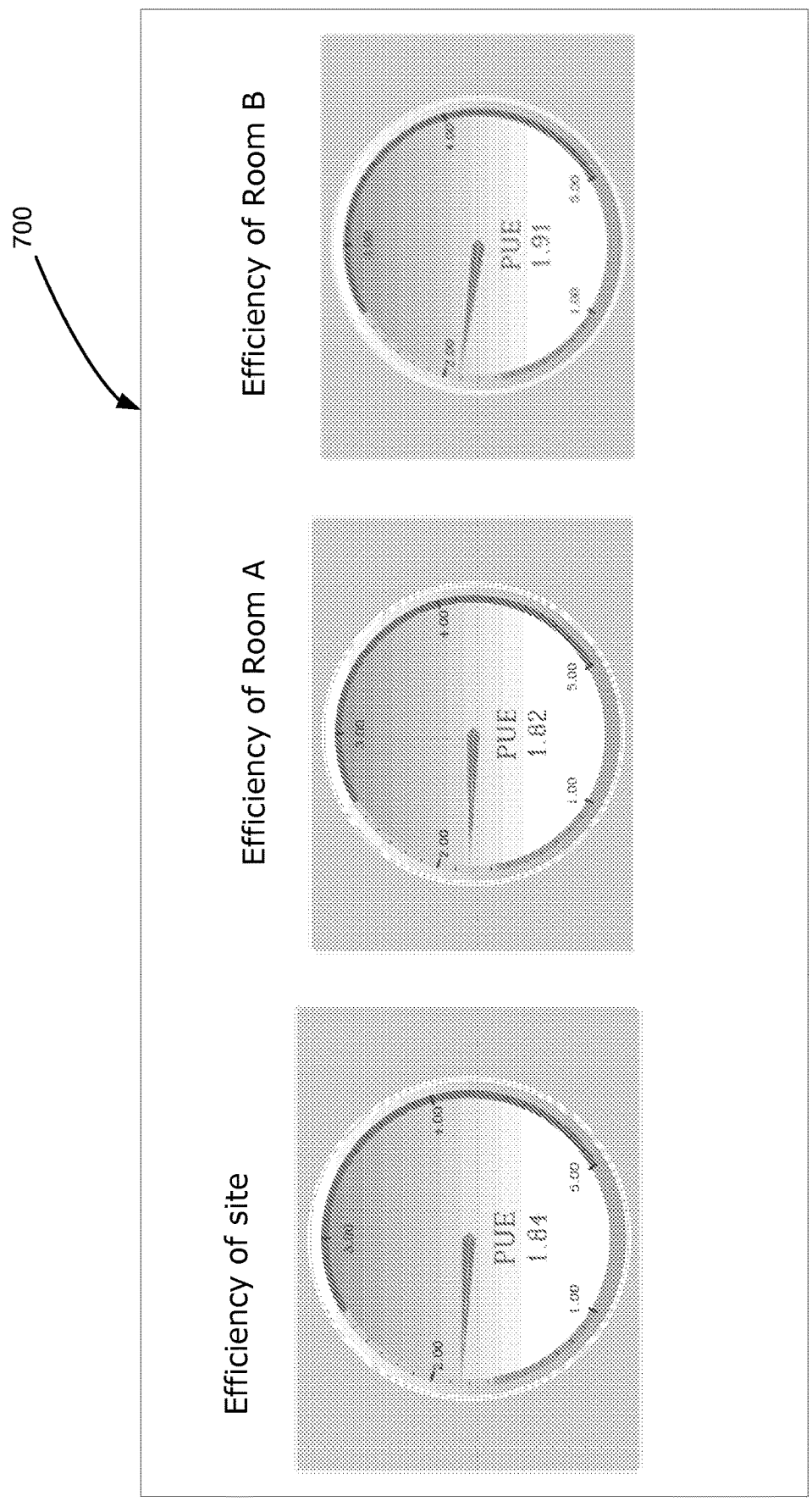
FIG. 7 illustrates one example of displaying shared resource PUE metric.

FIG. 7 illustrates one example of displaying shared subsystem PUE metric for the entire site, data center room A and data center room B. As shown, the PUE metric can include a range of values from 1.00 to 5.00, with the lowest numbers on the range corresponding to high degree of efficiency, while highest numbers corresponding to low degree of efficiency.

The systems, apparatus, and processes having thus been described herein enhance PUE calculations and include the capability of calculating exact PUE values for individual data center rooms and data centers as a whole. The systems and methods described herein can be used as an extension to existing PUE calculations. Knowing the load of the shared subsystems to include in the PUE calculation of the data center makes it possible to determine an accurate power consumption, and thus, how best to optimize power usage. Moreover, knowing the load of the shared subsystems enables the ability to calculate the PUE accurately in a data center that shares resources with other data centers or non-data center space. Having the ability to measure power consumption of a piece of equipment split between different power consumers avoids the unnecessary time and cost of installing meters. Thus, enabling calculations otherwise made difficult without changing the physical infrastructure of the data center.

The result of the calculation can be used to display the overall efficiency of a site, and to display a breakdown of the efficiency of the individual data center rooms.

The subsystem losses calculated by the systems and method described above may also be used to compute several data center efficiency metrics beyond PUE, such as Green Energy Coefficient (GEC), Energy Reuse Factor (ERF), and Carbon Usage Effectiveness (CUE). These metrics all factor in the source of energy supplying the data center (coal, oil, wind, etc.). Depending on the energy source, spent energy can have various carbon emission amounts. It is not necessary to alter the loss computations described in this disclosure to calculate these metrics, but the data center model should be augmented with data about the energy supplies. This can then be used to compute corresponding carbon emissions, which are then used to compute the metrics. Carbon emission data per energy supply could come from several sources, such as a national index, or be supplied by the individual energy companies.

Having thus described at least one illustrative embodiment of the disclosure, various alterations, modifications and improvements will readily occur to those skilled in the art. Such alterations, modifications and improvements are intended to be within the scope and spirit of the disclosure. Accordingly, the foregoing description is by way of example only and is not intended as limiting. The disclosure's limit is defined only in the following claims and the equivalents thereto.

What is claimed is:

1. A method of improving power usage efficiency of at least one first space in a data center that shares at least one resource provider with at least one second space in the data center, the method comprising:
   identifying the at least one first space in the data center within a computer-implemented model of the data center, the at least one first space including a first equipment group consuming at least one shared resource provided by the at least one shared resource provider;
   identifying a third space in the data center within the computer-implemented model of the data center, the third space including at least one shared resource provider, which shares the at least one shared resource with both the first equipment group and a second equipment group in the at least one second space in the data center;
   determining an amount of power consumed by the first equipment group;
   determining an amount of the at least one shared resource consumed by the first equipment group;
   determining an amount of power consumed by the at least one shared resource provider in providing the amount of the at least one shared resource to the first equipment group;
   calculating a loss incurred by the first equipment group based on the amount of power consumed by the first equipment group;
   calculating a loss incurred by the at least one shared resource provider based on the amount of power consumed by the at least one shared resource provider;
   calculating an efficiency metric for the at least one first space based on the amount of power consumed by the first equipment group, the amount of power consumed by the at least one shared resource provider, the loss incurred by the first equipment group, the loss incurred by the at least one shared resource provider, and an amount of power consumed by the second equipment group;
   calculating a second efficiency metric for the at least one second space;
   calculating a third efficiency metric for the data center based on the first efficiency metric and the second efficiency metric; and
   optimizing power usage of the first space in the computer-implemented model based on the calculated efficiency metric.

2. The method of claim 1, wherein calculating the efficiency metric for the at least one first space includes calculating at least one of a Power Usage Effectiveness (PUE), a Green Energy Coefficient (GEC) value, an Energy Reuse Factor (ERF) value, and a Carbon Usage Effectiveness (CUA).

3. The method of claim 2, wherein the efficiency metric for the at least one first space is a PUE metric and the method further comprises computing the PUE metric based on an estimated amount of power consumed by the first equipment group and an estimated loss incurred by the first equipment group.

4. The method of claim 1, wherein determining the amount of power consumed by the first equipment group includes determining whether equipment in the first equipment group incurs at least one of a fixed loss, a proportional loss, or a square-law loss.

5. The method of claim 1, further comprising receiving data descriptive of at least one of a measured amount of power consumed by respective pieces of equipment within the first equipment group, an estimate amount of power consumed by respective pieces of equipment within the first equipment group, efficiency properties of respective pieces of equipment within the equipment group, and power connections between respective pieces of equipment within the first equipment group.

6. The method of claim 1, wherein the at least one shared resource is cooling, the at least one shared resource provider is a cooling unit and the method further comprises:
   determining an amount of cooling consumed by distribution equipment supplying power to the cooling unit, the distribution equipment being included in the first equipment group; and
   adjusting the amount of power consumed by the at least one shared resource provider based on the amount of cooling consumed by the distribution equipment.

7. The method of claim 6, wherein determining the amount of cooling consumed by the distribution equipment supplying power to the cooling unit includes determining an amount of cooling consumed by distribution equipment supplying power to at least one of a CRAH, CRAC, fan, chiller unit, ventilation unit, cooling tower, and pumps.

8. The method of claim 6, further comprising:
   recalculating, responsive to adjusting the amount of power consumed by the at least one shared resource provider, the loss incurred by the at least one shared resource provider; and
   calculating a loss per kilowatt (kW) factor based on the loss incurred by the at least one shared resource provider, the amount of power consumed by the first equipment group, and the amount of power consumed by the distribution equipment.

9. The method of claim 1, wherein determining the amount of power consumed by the at least one shared resource provider includes calculating an estimated amount of power consumed by the at least one shared resource provider and determining the loss incurred by the at least one shared resource provider includes calculating an estimated loss incurred by the at least one shared resource provider and the method further comprises determining a ratio of consumption between the first equipment group and the second equipment group included within the at least one second space with the computer implemented model.

10. The method of claim 9, further comprising:
    calculating a first PUE for the at least one first space;
    calculating a second PUE for the at least one second space; and
    calculating a third PUE for the data center based on the first PUE and the second PUE.

11. The method of claim 10, wherein calculating the second PUE includes calculating the second PUE for an identified space including unrecorded equipment.

12. A management system for improving power usage efficiency of at least one first space in a data center that shares at least one resource provider with at least one second space in the data center, the system comprising:

a memory; and at least one processor coupled to the memory, the at least one processor being configured to:

identify the at least one first space in the data center within a computer-implemented model of the data center, the at least one first space including a first equipment group consuming at least one shared resource provided by the at least one shared resource provider;

identify a third space in the data center within the computer-implemented model of the data center, the third space including the at least one shared resource provider, which shares the at least one shared resource with both the first equipment group and a second equipment group in the at least one second space in the data center;

determine an amount of power consumed by the first equipment group;

determine an amount of the at least one shared resource consumed by the first equipment group;

determine an amount of power consumed by the at least one shared resource provider in providing the amount of the at least one shared resource to the first equipment group;

calculate a loss incurred by the first equipment group based on the amount of power consumed by the first equipment group;

calculate a loss incurred by the at least one shared resource provider based on the amount of power consumed by the at least one shared resource provider;

calculate an efficiency metric for the at least one first space based on the amount of power consumed by the first equipment group, the amount of power consumed by the at least one shared resource provider, the loss incurred by the first equipment group, the loss incurred by the at least one shared resource provider, and an amount of power consumed by the second equipment group;

calculate a second efficiency metric for the at least one second space;

calculate a third efficiency metric for the data center based on the first efficiency metric and the second efficiency metric; and output the calculated efficiency metric for optimizing power usage of the first space based on the calculated efficiency metric.

13. The system of claim 12, wherein the at least one processor is further configured to calculate at least one of a Power Usage Effectiveness (PUE), a Green Energy Coefficient (GEC) value, an Energy Reuse Factor (ERF) value, and a Carbon Usage Effectiveness (CUA).

14. The system of claim 13, wherein the efficiency metric is a PUE metric and the at least one processor is further configured to compute the PUE metric based on an estimated amount of power consumed by the first equipment group and an estimated loss incurred by the first equipment group.

15. The system of claim 12, wherein the at least one processor is further configured to determine whether equipment in the first equipment group incurs at least one of a fixed loss, a proportional loss, or a square-law loss.

16. The system of claim 12, wherein the at least one processor is further configured to receive data descriptive of at least one of a measured amount of power consumed by respective pieces of equipment within the first equipment group, an estimate amount of power consumed by respective pieces of equipment within the first equipment group, efficiency properties of respective pieces of equipment within the equipment group, and power connections between respective pieces of equipment within the first equipment group.

17. The system of claim 12, wherein the at least one shared resource is cooling, the at least one shared resource provider is a cooling unit, and the at least one processor is further configured to:

determine an amount of cooling consumed by distribution equipment supplying power to the cooling unit, the distribution equipment being included in the first equipment group; and adjust the amount of power consumed by the at least one shared resource provider based on the amount of cooling consumed by the distribution equipment.

18. The system of claim 12, wherein the at least one processor is further configured to determine an amount of cooling consumed by distribution equipment supplying power to at least one of a CRAH, CRAC, fan, chiller unit, ventilation unit, cooling tower, and pumps.

19. The system of claim 17, wherein the at least one processor is further configured to:

recalculate, responsive to adjusting the amount of power consumed by the at least one shared resource provider, the loss incurred by the at least one shared resource provider; and calculate a loss per kilowatt (kW) factor based on the loss incurred by the at least one shared resource provider, the amount of power consumed by the first equipment group, and the amount of power consumed by the distribution equipment.

20. A non-transitory computer readable medium having stored thereon sequences of instructions for improving power usage efficiency of at least one first space in a data center that shares at least one resource provider with at least one second space in the data center, including instructions that will cause at least one processor to:

identify the at least one first space in the data center within a computer-implemented model of the data center, the at least one first space including a first equipment group consuming at least one shared resource provided by the at least one shared resource provider;

identify a third space in the data center within the computer-implemented model of the data center, the third space including the at least one shared resource provider, which shares the at least one shared resource with both the first equipment group and a second equipment group in the at least one second space in the data center;

determine an amount of power consumed by the first equipment group;

determine an amount of the at least one shared resource consumed by the first equipment group;

determine an amount of power consumed by the at least one shared resource provider in providing the amount of the at least one shared resource to the first equipment group;

calculate a loss incurred by the first equipment group based on the amount of power consumed by the first equipment group;

calculate a loss incurred by the at least one shared resource provider based on the amount of power consumed by the at least one shared resource provider;

calculate an efficiency metric for the at least one first space based on the amount of power consumed by the first equipment group, the amount of power consumed by the shared resource provider, the loss incurred by the first equipment group, the loss incurred by the at least one shared resource provider, and an amount of power consumed by the second group;

calculate a second efficiency metric for the at least one second space;

calculate a third efficiency metric for the data center based on the first efficiency metric and the second efficiency metric; and output the calculated efficiency metric for optimizing power usage of the first space based on the calculated efficiency metric.

* * * * *